United States Patent [19]

Wakamori et al.

[11] Patent Number: 5,283,302

[45] Date of Patent: Feb. 1, 1994

[54] VINYLIDENE FLUORIDE POLYMER AND METHOD OF MAKING SAME

[75] Inventors: Hideki Wakamori; Fujio Suzuki; Katsuo Horie, all of Iwaki, Japan

[73] Assignee: Kureha Chemical Industry Co., Ltd., Tokyo, Japan

[21] Appl. No.: 923,487

[22] Filed: Aug. 3, 1992

[30] Foreign Application Priority Data

Aug. 1, 1991 [JP] Japan ................... 3-216265

[51] Int. Cl.$^5$ .............................................. C08F 14/18
[52] U.S. Cl. ........................................ 526/216; 526/254; 525/276
[58] Field of Search ................. 526/254, 216; 525/276

[56] References Cited

U.S. PATENT DOCUMENTS

| | | | |
|---|---|---|---|
| 3,069,401 | 12/1962 | Gallagher | 526/254 |
| 3,701,749 | 10/1972 | Segawa et al. | 524/90 |
| 3,719,644 | 3/1973 | Segawa et al. | 525/367 |
| 3,798,287 | 3/1974 | Murayama et al. | 525/276 |
| 3,839,305 | 10/1974 | Moore . | |
| 3,845,024 | 10/1974 | Weaver . | |
| 5,095,081 | 3/1992 | Bacque et al. | 526/216 |
| 5,109,086 | 4/1992 | Watanabe et al. | 526/254 |

FOREIGN PATENT DOCUMENTS

| | | | |
|---|---|---|---|
| 0093404 | 4/1983 | European Pat. Off. . | |
| 805115 | 11/1958 | United Kingdom | 526/216 |
| 885809 | 12/1961 | United Kingdom | 526/216 |
| 1149451 | 4/1969 | United Kingdom | 526/216 |

*Primary Examiner*—Joseph L. Schofer
*Assistant Examiner*—N. Sarofim
*Attorney, Agent, or Firm*—Sherman and Shalloway

[57] ABSTRACT

Polyvinylidene fluoride (PVDF) having such crystallization properties as to produce small spheralite sizes without sacrificing properties, processability, purity, etc. comprises 99.5–96 wt. % of vinylidene fluoride and 0.5–4 wt. % of a comonomer selected from the group consisting of hexafluoropropylene, tetrafluoroethylene and mixtures thereof, has a logarithmic viscosity of 0.9–1.3 dl/g and a molecular weight distribution, as expressed by the ratio of weight average molecular weight to number average molecular weight, of 2.2–2.8. The PVDF is formed by suspension polymerizing vinylidene fluoride and 1–5 wt. % of the desired comonomer, in an aqueous medium in the presence of an oil-soluble initiator, so that a logarithmic viscosity [$\eta_1$] of 1.3–1.9 dl/g is obtained at a vinylidene fluoride conversion of 10–50%; then adding a chain transfer agent to the medium and continuing polymerization so that the logarithmic viscosity [$\eta_2$] of the final polymer is 0.3–0.7 dl/g lower than [$\eta_1$] but remains in the range of 0.9–1.3 dl/g.

4 Claims, No Drawings

VINYLIDENE FLUORIDE POLYMER AND METHOD OF MAKING SAME

BACKGROUND OF THE INVENTION

1. Technical Field of the Invention

This invention relates generally to a vinylidene fluoride polymer and a method of making the same, and more particularly to a vinylidene fluoride polymer (hereinafter referred to as "PVDF" in short) and a method of manufacturing the same with a suspension polymerization process.

2. Description of the Prior Art

PVDF is now being widely used as a material for piping and valves used in chemical plants, the lining and coating materials of storage tanks and reaction vessels due to its excellent mechanical strength and chemical resistance. PVDF has such good melt-processability and thermal stability that it can be processed without recourse to thermal stabilizers, processing aids, etc. Due to this unique features, PVDF molding have a feature of high purity. Its high purity, together with its excellent chemical resistance, often makes PVDF particularly suitable for materials for facilities for the manufacture and storage of ultra-pure water and ultra-pure chemicals used in semiconductor manufacture.

PVDF is commercially manufactured by the suspension polymerization and emulsion polymerization processes. The suspension polymerization process is such that monomers are dispersed in droplets in the water as a suspension medium using a dispersant, and are polymerized using organic peroxides dissolved in the monomers to obtain granular polymers of sizes from 100 to 300 microns. Suspension polymerization products are manufactured with a simpler process, and easier to handle because of their granular properties, compared with emulsion polymerization products. In addition, suspension polymerization products are of higher purity than emulsion polymerization products because they do not contain emulsifiers or salting agents. Formation of large spherulites in moldings of suspension polymerization products, on the other hand, may be regarded as a drawback in some applications.

PVDF is a crystalline resin which tends to form spherulites during cooling and solidification after melt processing, and it is generally known that the surface smoothness of PVDF moldings largely depends on the size of spherulites.

When PVDF having lowered surface smoothness due to the presence of large spherulites is used to manufacture piping for ultra-pure water manufacturing lines, minute dents between the spherulites on the inside surface of the PVDF piping act as a source for propagation of microorganisms, lowering the purity of pure water. When used as coatings for reaction vessels and storage tanks, the PVDF paint films having large spherulites are susceptible to stress cracking, reducing their durability. It is generally believed that the size of spherulites depends on the cooling rate of PVDF moldings after melt processing; the faster PVDF moldings are cooled, the finer spherulites are formed. In some molding methods, quenching may be impossible. During the extrusion of thick-wall pipe, for example, when the extruded pipe is cooled from the external surface, large spherulites are formed because the inside of the pipe is not cooled so quickly, deteriorating the smoothness of the pipe inside. To overcome this problem, therefore, polymers having such crystallization characteristics as to form fine spherulites easily even at a relatively low cooling rate have long been needed.

Means for reducing the size of PVDF spherulites include;

(1) The size of spherulites of PVDF moldings can be reduced to some extent by increasing the molecular weight of polymers. With this method, however, satisfactory effects cannot necessarily be accomplished. Conversely, as the molecular weight is increased, some undesirable phenomena, such as the difficulty in processing due to increased melt viscosity, discoloring caused by the decomposition of polymers due to increased processing temperature, and formation of hydrogen fluoride due to increased processing temperature, are encountered.

(2) As proposed in U.S. Pat. Nos. 3,701,749 and 3,719,644, the spherulites of PVDF moldings can be reduced in size by adding a nucleating agent, such as flavanthrone and salt. Addition of these nucleating agents is not favorable because it could lower the thermal stability of PVDF, and lead to discoloring caused by the decomposition of polymers, as well as to the formation of hydrogen fluoride. Furthermore, these nucleating agents are impurities in polymers, making the polymers unsuitable for applications requiring high purity, such as ultra-pure water piping.

(3) It is known that the size of spherulites can be reduced by copolymerizing vinylidene fluoride monomers with tetrafluoroethylene, trifluoromonochloroethylene, hexafluoropropylene, vinyl fluoride, etc. To sufficiently reduce the size of spherulites with this method, however, more than 10 wt. % of comonomers are required. As a result, the degree of crystallization of polymers is lowered, and the crystalline melting point is also lowered remarkably. This leads to deterioration in heat resistance, chemical resistance and mechanical strength as beneficial properties of PVDF.

(4) USP3,798,287 has proposed a method of adding fluorine monomers which give the polymer having higher crystallization temperatures than PVDF after the polymerization of vinylidene fluoride monomers has been completed so as to facilitate polymerization within PVDF particles. With this process, however, vinyl fluoride severely reduces the thermal stability of the resulting PVDF. Moreover, post-addition of trifluoromonochloroethylene has less effects of reducing the size of PVDF spherulites, and also lowers the thermal stability of PVDF.

Post-addition of tetrafluoroethylene, on the other hand, remarkably reduce the size of spherulites and improve the thermal stability of PVDF, but polytetrafluoroethylene hardly disperse uniformly in PVDF, making the size of the spherulites of PVDF moldings uneven, and posing some problems in the surface smoothness of moldings.

OBJECT OF THE INVENTION

It is an object of this invention to provide a vinylidene fluoride polymer (PVDF) having such crystallization characteristics as to form fine spherulite sizes without sacrifices of physical properties, processability, purity, etc., and also to provide a suspension polymerization method to obtain the same.

SUMMARY OF THE INVENTION

After years of research efforts to achieve these objectives, the present inventors discovered that the size of the resulting PVDF spherulites can be reduced materially by copolymerizing small amounts of comonomers, and yet controlling the molecular weight distribution to preferable values during the suspension polymerization of vinylidene fluoride monomers, and have finally completed this invention.

That is, the PVDF provided by this invention comprises the monomer unit content of 99.5–96 wt. % of vinylidene fluoride, and the monomer unit content of 0.5–4 wt. % of monomers (hereinafter sometimes referred to as "comonomer") selected from hexafluoropropylene and/or tetrafluoroethylene, with logarithmic viscosities of 0.9–1.3 dl/g, and the molecular-weight distribution, as expressed by the ratio (Mw/Mn) of weight-average molecular weight and number-average molecular weight, of 2.2–2.8. According to this invention, PVDF can be manufactured by using 1–5 wt. % of monomers selected from hexafluoropropylene and/or tetrafluoroethylene as comonomers in the course of the suspension polymerization of vinylidene fluoride monomers in an aqueous medium in the presence of an oil-soluble polymerization initiator (hereinafter referred to as "polymerization initiator"), continuing the polymerization so that the logarithmic viscosity $[\eta_1]$ of the polymer becomes 1.3–1.9 dl/g from the start of polymerization until the rate of polymerization conversion (hereinafter referred to as "polymerization conversion rate") of vinylidene fluoride monomers reaches 10–50%, and further continuing polymerization by adding a chain transfer agent when polymerization conversion rate reaches 10–50% so that the logarithmic viscosity $[\eta_2]$ of the eventually obtained polymer becomes 0.3–0.7 dl/g lower than $[\eta_1]$, and remains at 0.9–1.3 dl/g.

According to this invention, the PVDF having such fine spherulites that hitherto cannot be obtained with the prior art can be easily obtained in the suspension polymerization process, and as a result, PVDF moldings having excellent surface smoothness can be obtained without sacrifices of physical properties, processability and purity.

DETAILED DESCRIPTION OF THE PREFERRED EMBODIMENTS

The amount of addition of hexafluoropropylene and/or tetrafluoroethylene used in this invention should be 1–5 wt. %, preferably 2–4 wt. %, of the total monomers. By using them by more than 1 wt. %, the spherulites in the PVDF moldings can be reduced to a sufficient degree, and by using less than 5 wt. %, the resulting PVDF is of small spherulites, and the crystalline melting point and crystallinity of the PVDF do not fall appreciably, and PVDF moldings are excellent in heat resistance, mechanical strength and resistance to organic solvents. These hexafluoropropylene and/or tetrafluoroethylene may be added en bloc to a polymerization reactor at the time of initial charging, or a part or total amount of them may be added in separate doses or continuously during polymerization.

In this invention, polymerization is effected so that the logarithmic viscosity $[\eta_1]$ of polymers becomes 1.3–1.9 dl/g from the start of polymerization till polymerization conversion rate reaches 10–50%, preferably 20–45%. The term logarithmic viscosity used here is a characteristic value correlated with molecular weight obtained by a measuring method, which will be described later.

If $[\eta_1]$ is less than 1.3 dl/g, the size of spherulites in the resulting PVDF moldings does not become sufficiently small, while with $[\eta_1]$ exceeding 1.9 dl/g, unmelted PVDF remains at the time of melt molding, resulting in fish eyes, deteriorating the external appearance and surface smoothness of the moldings.

The timing suitable for reducing logarithmic viscosity by adding a chain transfer agent in the course of polymerization is the time at which the polymerization conversion rate reaches 10–50%. If the chain transfer agent is added at a polymerization conversion rate of less than 10%, the spherulites of the eventual PVDF do no become sufficiently small, while at a polymerization conversion rate of over 50%, a large amount of chain transfer agent is required to limit $[\eta_2]$ in the range of 0.3–0.7 dl/g lower than $[\eta_1]$, and to a range of 0.9–1.3 dl/g, and yet the size of spherulites does not necessarily become small.

The timing for adding the chain transfer agent in the manufacturing method of this invention, that is, the time at which the polymerization conversion rate becomes 10–50% and $[\eta_1]$ becomes 1.3–1.9 dl/g can be determined by the change in pressure or polymerizing time at which a predetermined polymerization conversion rate is reached in the following manner; by obtaining in advance through preliminary experiments the change in pressure and polymerization conversion rate when a relatively large amount of hexafluoropropylene is charged at the initial stage of polymerization, for example; or by obtaining polymerization time and polymerization conversion rate for such polymerization involving less pressure changes.

In this invention, the logarithmic viscosity $[\eta_2]$ of the eventually obtained PVDF must be kept at 0.9–1.3 dl/g. If this value is less than 0.9 dl/g, the size of spherulites in moldings does not become sufficiently small, resulting in poor surface smoothness of PVDF moldings, and lowered impact strength. In some cases, this tends to cause stress cracks. If this value exceeds 1.3 dl/g, the melt viscosity of PVDF increases, making melt molding difficult.

Furthermore, $[\eta_2]$ should preferably be lower than $[\eta_1]$ within the range of 0.3–0.7 dl/g, preferably within the range of 0.4–0.5 dl/g. The difference between $[\eta_2]$ and $[\eta_1]$ is related to the molecular-weight distribution of the resulting PVDF. Molecular-weight distribution can be expressed by the ratio (Mw/Mn) of weight-average molecular weight (Mw) and number-average molecular weight (Mn). If $[\eta_2]$ becomes over 0.7 dl/g smaller than $[\eta_1]$, the molecular-weight distribution of the resulting PVDF exceeds 2.8. This results in lowered impact resistance and the loss of melting uniformness, adversely affecting the processability of PVDF and the performances of moldings, such as increased fish eyes in moldings.

In addition, if the difference between both is less than 0.3 dl/g, the molecular-weight distribution of the resulting PVDF becomes less than 2.2, the effect of sufficiently reducing the size of spherulites cannot be accomplished.

The logarithmic viscosity of PVDF is determined by polymerization temperature, the type and amount of polymerization initiator, the type and amount of chain transfer agent. That is, with the same types of polymerization initiator and chain transfer agent (polymerization aid) used, increased polymerization temperature lowers logarithmic viscosity, while lowered polymerization temperature increases logarithmic viscosity. With polymerization conditions kept constant, except for polymerization initiator or chain transfer agent, increasing the amounts of these polymerization aids lowers logarithmic viscosity, whereas decreasing the amounts of these polymerization aids increases logarithmic viscosity. By obtaining in advance through preliminary experiments the correlationship among polymerization temperature, the formulations of polymerization initiator and chain transfer agent, and logarithmic viscosity, aimed logarithmic viscosity can be set. Furthermore, the amount of addition of chain transfer agent at polymerization conversion rate of 10-50% can also be determined in the same manner. By determining the types of polymerization initiator and chain transfer agent in this way, the aimed logarithmic viscosity can be easily determined by adjusting the dose.

Chain transfer agents usable in this invention include acetone, isopropyl acetate, ethyl acetate, diethyl carbonate, dimethyl carbonate, pyroethyl carbonate, propionic acid, trifluoroacetate, trifluoroethyl alcohol, formaldehyde dimethylacetal, 1,3-butadiene epoxide, 1,4-dioxane, $\beta$-butyllactone, ethylene carbonate, vinylene carbonate, etc. When taking into consideration the capability of effectively lowering logarithmic viscosity, the maintenance of the thermal stability of PVDF, the ease of availability, and the ease of handling, acetone and ethyl acetate, particularly ethyl acetate, are more desirable.

Polymerization initiators usable in this invention include di-n-propyl peroxydicarbonate (NPP), and diisopropyl peroxydicarbonate. The types and amounts of these polymerization initiators and chain transfer agents are selected so as to obtain a predetermined logarithmic viscosity, and one or more than two types of them can be used in combination.

Typical dispersants usable in this invention include partially saponified polyvinylacetate, water-soluble cellulose ethers such as methyl cellulose, hydroxyethyl cellulose, hydroxypropyl cellulose, hydroxypropylmethyl cellulose, water-soluble polymers such as polyacrylate, gelatin. The ratio of water/monomers is usually 1.5/1-3/1 in terms of weight ratio, and 0.01-0.1 parts by weight of dispersant are used for 100 parts by weight of monomers. In addition, this invention can use PH buffers, such as polyphosphates.

As the method of charging water, monomers, dispersant, polymerization initiator, and other polymerization aids in this invention, any methods that can be used for normal suspension polymerization may be employed.

For example, as water, dispersant, polymerization initiator, chain transfer agent and other polymerization aids are charged, then deaeration is carried out by decompression, monomers are subsequently charged, and stirring is started. After heating to a predetermined temperature, polymerization is started at that temperature, and the chain transfer agent is injected when the polymerization conversion rate reaches 10-50%, and the polymerization is further continued. As the polymerization proceeds to such an extent that the pressure in the polymerization reactor drops by more than 10 kg/cm$^2$ from the equilibrium pressure of the initial monomer mixture (that is, to the extent that the polymerization conversion rate reaches over 80%), unreacted monomers are recovered, and the resulting polymers are dewatered, flushed with water and dried.

The PVDF obtained with the above manufacturing method consists of the monomer unit content of vinylidene fluoride of 99.5-96 wt. %, preferably 99.0-97.0 wt. %, and the monomer unit content of comonomers of 0.5-4 wt. %, preferably 1.0-3.0 wt. %. Combination of both monomer units are random. The logarithmic viscosity [$\eta_2$] is 0.9-1.3 dl/g, as noted earlier, the molecular-weight distribution is 2.2-2.8, preferably 2.3-2.6. The size of PVDF spherulites, as measured by the method which will be described later, is 1-30 $\mu$m, preferably 5-25 $\mu$m, and the crystalline melting point is in the range of 163°-176° C., preferably 168°-173° C.

In the following, this invention will be described more specifically, referring to examples and comparative examples. This invention is not limited to these examples. It should be noted that percentage and part numbers used in these examples and comparative examples are expressed in terms of weight, unless otherwise specified. The property values of PVDF shown in the examples and comparative examples were measured by the following methods.

(1) Molecular-weight distribution (Mw/Mn)

A dimethylacetamide solution in which polymer powders were dissolved at a concentration of 0.2 wt. % was subjected to a gel-permeation chromatograph (manufactured by Tosoh Corp.; 8010 Series, Column TSK-GEL GMHXL, dia. 7.8 mm, length 300 mm, 2 columns in series; temperature 40° C., flow rate 0.8 ml/min.) to measure the ratio (Mw/Mn) of weight-average molecular weight (Mw) and number-average molecular weight (Mn).

(2) Composition analysis of Polymers

Measurements were made using $^{19}$F NMR.

(3) Crystalline Melting Point

The endothermic peak was measured with a differential scanning calorimeter when PVDF was heated at a rate of 10° C./min, and the temperature at that time was obtained as the crystalline melting point.

(4) Logarithmic Viscosity

The logarithmic viscosity was calculated using the following equation on the basis of the dropping time of a 30° C. solution obtained by dissolving polymer powders into dimethylformamide at a concentration of 4 g/l on an Ubbelohde's viscometer.

Logarithmic viscosity $[\eta] = \ln(\eta_{rel})/C$ dl/g where $\eta_{rel}$ = dropping time (sec) of sample solution/dropping time (sec) of solvent C = Concentration of sample solution (0.4 g/dl).

(5) Spherulite Size

Polymer powders were mixed for three minutes in a roll having a roll surface temperature of 165° C., then 0.1 g of the mixture was pressed by applying a pressure of 100 kg/cm$^2$ at a temperature of 240° C. for three minutes. The pressed mixture, while kept in the pressurized state, was cooled at a constant rate to 100° C. in 1 hour. The spherulites in the resulting approx. 20 $\mu$m-thick film were photographed with a polarized microscope to measure the average value of the spherulite size.

(6) Yield-point Strength

As in the case of (5) above, a 1 mm-thick pressed sheet were prepared, and Type-3 dumbbell specimens was taken from this sheet and subjected to measurement of a yield point strength at a tension rate of 10 mm/min. and a temperature of 23° C. according to ASTM-D638.

(7) Izod Impact Strength

The roll-mixed sheet obtained in (5) above was pressed for six minutes at a temperature of 240° C. and a pressure of 100 kg/cm$^2$ to obtain a 6 mm-thick pressed sheet. In accordance with ASTM-D256, the impact strength of V-notched (R=0.25 mm) specimens was measured.

(8) Melt Viscosity

The roll-mixed sheet obtained in (5) above was cut, and the melt viscosity of the sheet at a temperature of 240° C. and a shear rate of 50 sec$^{-1}$ was measured using a capillograph (manufactured by Toyo Seiki Co., Ltd.).

(9) Fish Eyes

The roll-mixed sheet obtained in (5) above was pressure-formed into a 1 mm-thick sheet at a temperature of 240° C. and a pressure of 100 kg/cm$^2$. This sheet is placed between an iron plate having an air-blow hole, and an iron plate having a 12 cm-dia. circular opening via a rubber packing, and held in place with a clamp. While heating the sheet on the opening side to a surface temperature of approximately 150° C., the sheet is inflated to a thickness of approximately 300 μm by injecting the air from the air-blow hole. Then, the number of unmelted material contained in a 5 cm×5 cm area of the resulting film was counted.

(10) Smoothness of Pipe Inside

In accordance with JIS B0601, the lengthwise smoothness of the inside of a pipe was measured with a surface roughness tester (manufactured by Tokyo Seimitsu Co., Ltd.: Surfcom 550A Type) to obtain the average roughness Ra for a reference length of 2.5 mm.

EXAMPLE 1

The following monomers and polymerization aids, etc. were charged in a stainless steel-made autoclave having an inner capacity of 14 liters, and polymerization reaction was started at 25° C.

| | |
|---|---|
| Vinylidene fluoride | 97.5 parts (3,000 g) |
| Hexafluoropropylene | 2.5 parts |
| Pure water | 300.0 parts |
| Methyl cellulose | 0.1 parts |
| Sodium pyrophosphate | 0.2 parts |
| NPP | 0.61 parts |

After 3 hours from the start of polymerization (polymerization conversion rate: 35%), 3.0 parts of ethyl acetate was added and the polymerization reaction was continued. At a point of time when the inside pressure of polymerization reactor drops 25 kg/cm$^2$ below from the equilibrium pressure (39 kg/cm$^2$) after the start of polymerization, unreacted monomers were recovered, and the resulting polymer slurry was dewatered, flushed with water and dried. The chemical and physical property values of the resulting polymer are shown in Table 1.

EXAMPLES 2–5

The polymerization was conducted in the same manner as in Example 1 except that the amounts of NPP and ethyl acetate and the timing of their additions, [η$_1$] of the polymer at the addition of ethyl acetate, [η$_2$] of the polymer obtained eventually were changed as shown in Table 1. The chemical and physical property values of the resulting polymer are shown in Table 1.

EXAMPLE 6

The polymerization was conducted in the same manner as in Example 1, except that the amount of hexafluoropropylene was changed to 4%. The chemical and physical property values are shown in Table 1.

EXAMPLE 7

The polymerization was conducted in the same manner as in Example 1, except that the amounts of NPP and ethyl acetate, and polymerization temperature were changed as shown in Table 1. The chemical and physical property values of the resulting polymer are shown in Table 1.

EXAMPLE 8

The polymerization was conducted in the same manner as in Example 1, except that hexafluoropropylene was replaced with tetrafluoroethylene. The chemical and physical property values are shown in Table 1.

COMPARATIVE EXAMPLES 1–5

The polymerization was conducted in the same manner as in Example 1, except that the amounts of NPP and ethyl acetate, and the timing of their additions, [η$_1$] of the polymer at the addition of ethyl acetate, and [η$_2$] of the polymer obtained eventually were changed as shown in Table 2. The chemical and physical property values of the resulting polymer are shown in Table 2.

COMPARATIVE EXAMPLE 6

The polymerization was conducted in the same manner as in Example 1, except that the amount of hexafluoropropylene was changed to 6%. The chemical and physical property values of the resulting polymer are shown in Table 2.

COMPARATIVE EXAMPLE 7

The polymerization was conducted in the same manner as in Example 1, except that the amount of NPP was increased and ethyl acetate was not added in the course of reaction. The chemical and physical property values are shown in Table 2.

COMPARATIVE EXAMPLE 8

The polymerization was conducted in the same manner as in Example 1 except that hexafluoropropylene was not used. The chemical and physical property values of the resulting polymer are shown in Table 2.

COMPARATIVE EXAMPLE 9

The polymerization was conducted in the same manner as in Comparative Example 7, except that hexafluoropropylene was not used. The chemical and physical property values of the resulting polymer are shown in Table 2.

EXAMPLE 9, COMPARATIVE EXAMPLES 10 AND 11

The polymerization was conducted in a stainless steel-made autoclave having an inner capacity of 6,300 liter with the same polymerization formulations as with Example 1, Comparative Examples 8 and 9, in which 1,200 kg of vinylidene fluoride was used (Example 9, Comparative Examples 10 and 11). The resulting polymer was molded into a pipe having an outside diameter of 100 mm and a thickness of 6 mm using a 90 mm-dia. single-screw extruder having a cylinder temperature of 180° C. under the hopper and 240° C. at the tip thereof, and a die temperature of 230° C. through a vacuum sizing die equipped with a water-cooled jacket. The average surface roughness Ra of the inside of the resulting pipe was as good as 0.3 μm (Example 9) with the polymer produced from the formulation of Example 1, compared with 0.9 μm (Comparative Example 10) with the polymer produced from the formulation of Comparative Example 8, and 2.2 μm (Comparative Example 11) with the polymer produced from the formulation of Comparative Example 9.

This invention can be applied in other various ways without significant departure from the purpose and main characteristics thereof. Consequently, the aforementioned embodiments represent mere examples in all respects, and should not be construed as restrictive. The scope of this invention is defined by the scope of claims, and is by no means bound by the text of the Specification. Furthermore, all modifications and alterations belonging to the equivalent scope of the claims fall within the scope of this invention.

TABLE 1

| Example | 1 | 2 | 3 | 4 | 5 | 6 | 7 | 8 |
|---|---|---|---|---|---|---|---|---|
| Comonomer | | | | | | | | |
| Type | HFP | HFP | HFP | HFP | HFP | HFP | HFP | TFE |
| Charge (parts) | 2.5 | 2.5 | 2.5 | 2.5 | 2.5 | 4.0 | 2.5 | 2.5 |
| Polymerization initiator | | | | | | | | |
| Type | NPP | NPP | NPP | NPP | NPP | NPP | NPP | NPP |
| Charge (parts) | 0.61 | 0.61 | 0.61 | 0.49 | 0.75 | 0.61 | 0.20 | 0.61 |
| Chain transfer agent | | | | | | | | |
| Type | EAC | EAC | EAC | EAC | EAC | EAC | EAC | EAC |
| Addition amount | 3.0 | 6.5 | 1.2 | 1.4 | 4.7 | 3.0 | 2.0 | 3.0 |
| Polymerization conversion rate at addition (%) | 35 | 45 | 20 | 35 | 35 | 35 | 35 | 35 |
| Logarithmic viscosity [$\eta_1$] at addition (dl/g) | 1.6 | 1.6 | 1.6 | 1.8 | 1.4 | 1.58 | 1.6 | 1.62 |
| Polymerization temperature (°C.) | 25 | 25 | 25 | 25 | 25 | 25 | 40 | 25 |
| Polymerization yield (%) | 90 | 90 | 90 | 90 | 90 | 90 | 90 | 90 |
| Chemical and physical property values of PVDF | | | | | | | | |
| Logarithmic viscosity [$\eta_2$] (dl/g) | 1.12 | 1.13 | 1.16 | 1.30 | 0.97 | 1.10 | 1.15 | 1.14 |
| [$\eta_1$]-[$\eta_2$] (dl/g) | 0.48 | 0.47 | 0.44 | 0.50 | 0.43 | 0.48 | 0.45 | 0.48 |
| Monomer unit content of comonomers (wt. %) | 1.4 | 1.4 | 1.4 | 1.3 | 1.5 | 2.3 | 1.4 | 2.8 |
| Molecular-weight distribution (Mw/Mn) | 2.5 | 2.5 | 2.3 | 2.3 | 2.5 | 2.6 | 2.4 | 2.4 |
| Melt viscosity ($\times 10^{-3}$ poise) | 34 | 34 | 35 | 51 | 22 | 34 | 34 | 34 |
| Crystalline melting point (°C.) | 172 | 171 | 172 | 171 | 172 | 168 | 170 | 173 |
| Spherulite size (μm) | 15 | 20 | 20 | 15 | 25 | 15 | 15 | 10 |
| Yield strength (kg/mm$^2$) | 5.3 | 5.3 | 5.3 | 5.2 | 5.4 | 4.9 | 5.0 | 5.4 |
| Izod impact strength (kg-cm/cm) | 15 | 12 | 18 | 20 | 10 | 23 | 15 | 17 |
| No. of fish eyes | 3 | 6 | 6 | 10 | 8 | 3 | 5 | 8 |

Note)
HFP: hexafluoropropylene,
TFE: tetrafluroethylene,
NPP: di-n-propylperoxydicarbonate,
EAC: ethyl acetate

TABLE 2

| Comparative Example | 1 | 2 | 3 | 4 | 5 | 6 | 7 | 8 | 9 |
|---|---|---|---|---|---|---|---|---|---|
| Comonomer | | | | | | | | | |
| Type | HFP | HFP | HFP | HFP | HFP | HFP | HFP | — | — |
| Charge (parts) | 2.5 | 2.5 | 2.5 | 2.5 | 2.5 | 6.0 | 2.5 | — | — |
| Polymerization initiator | | | | | | | | | |
| Type | NPP | NPP | NPP | NPP | NPP | NPP | NPP | NPP | NPP |
| Charge (parts) | 0.37 | 0.93 | 0.61 | 0.49 | 0.61 | 0.61 | 1.05 | 0.61 | 1.05 |
| Chain transfer agent | | | | | | | | | |
| Type | EAC | EAC | EAC | EAC | EAC | EAC | — | EAC | — |
| Addition amount | 10.0 | 1.3 | 20.0 | 0.6 | 20.0 | 3.0 | — | 3.0 | — |
| Polymerization conversion rate at addition (%) | 35 | 25 | 25 | 35 | 60 | 35 | — | 35 | — |
| Logarithmic viscosity [$\eta_1$] at addition (dl/g) | 2.1 | 1.2 | 1.6 | 1.8 | 1.6 | 1.54 | — | 1.63 | — |
| Polymerization temperature (°C.) | 25 | 25 | 25 | 25 | 25 | 25 | 25 | 25 | 25 |
| Polymerization yield (%) | 90 | 90 | 90 | 90 | 90 | 90 | 90 | 90 | 90 |
| Chemical and physical property values of PVDF | | | | | | | | | |
| Logarithmic viscosity [$\eta_2$] (dl/g) | 1.16 | 1.0 | 0.80 | 1.40 | 1.16 | 1.07 | 1.12 | 1.13 | 1.14 |
| [$\eta_1$]-[$\eta_2$] (dl/g) | 0.94 | 0.20 | 0.80 | 0.40 | 0.44 | 0.47 | — | 0.50 | — |
| Monomer unit content of comonomers (wt. %) | 1.4 | 1.2 | 1.4 | 1.4 | 1.4 | 4.2 | 1.5 | — | — |
| Molecular-weight distribution | 3.1 | 2.0 | 3.5 | 2.5 | 2.4 | 2.6 | 2.1 | 2.5 | 2.1 |

TABLE 2-continued

| Comparative Example | 1 | 2 | 3 | 4 | 5 | 6 | 7 | 8 | 9 |
|---|---|---|---|---|---|---|---|---|---|
| (Mw/Mn) | | | | | | | | | |
| Melt viscosity ($\times 10^{-3}$ poise) | 35 | 22 | 10 | 60 | 32 | 36 | 34 | 34 | 34 |
| Crystalline melting point (°C.) | 172 | 172 | 172 | 172 | 172 | 159 | 172 | 175 | 176 |
| Spherulite size (μm) | 10 | 100 | 40 | 60 | 50 | 20 | 150 | 80 | 250 |
| Yield strength (kg/mm$^2$) | 5.3 | 5.4 | 5.4 | 5.2 | 5.3 | 3.5 | 5.3 | 5.6 | 5.7 |
| Izod impact strength (kg-cm/cm) | 8.5 | 10 | 5.5 | 12 | 15 | 20 | 15 | 12 | 15 |
| No. of fish eyes | 200< | 5 | 200< | 30 | 12 | 5 | 4 | 4 | 4 |

Note)
HFP: hexafluoropropylene,
TFE: tetrafluroethylene,
NPP: di-n-propylperoxydicarbonate,
EAC: ethyl acetate

What is claimed is:

1. A method of manufacturing a vinylidene fluoride polymer comprising
    suspension polymerizing, in an aqueous medium, in the presence of an oil-soluble polymerization initiator, vinylidene fluoride and 1–5 wt. % of a comonomer selected from the group consisting of hexafluoropropylene, tetrafluoroethylene and mixtures thereof so that the logarithmic viscosity [$\eta_1$] of formed polymer is 1.3–1.9 dl/g at a vinylidene fluoride monomer conversion rate of 10–50%;
    then, adding a chain transfer agent to said medium, and continuing said polymerization so that the logarithmic viscosity [$\eta_2$] of the finally formed polymer is 0.3–0.7 dl/g smaller than [$\eta_1$], and yet remains in the range of 0.9–1.3 dl/g.

2. The method of manufacturing a vinylidene fluoride polymer as set forth in claim 1, wherein said suspension polymerization proceeds so that said logarithmic viscosity [$\eta_1$] of formed polymer is 1.3–1.9 dl/g at a vinylidene fluoride monomer conversion rate of 20–45%; and then, said chain transfer agent is added to said medium and polymerization continued.

3. The method of manufacturing a vinylidene fluoride polymer as set forth in claim 1, wherein said polymerization is continued so that the logarithmic viscosity [$\eta_2$] of the finally formed polymer is 0.4–0.5 dl/g smaller than [$\eta_1$].

4. The method of manufacturing a vinylidene fluoride polymer as set forth in claim 1, wherein said chain transfer agent is ethyl acetate.

* * * * *